United States Patent [19]

Aoyama et al.

[11] Patent Number: 5,733,975
[45] Date of Patent: Mar. 31, 1998

[54] POLYOLEFIN RESIN COMPOSITION, PROCESS FOR THE PREPARATION THEREOF AND MOLDED ARTICLE MADE THEREOF

[75] Inventors: Taizo Aoyama; Kazuhiro Hara; Yoshihiko Okimura; Akinori Kitora Shu, all of Takasago; Hiroki Kobayashi; Michinobu Izumi, both of Kobe, all of Japan

[73] Assignee: Kanegafuchi Kagaku Kogyo Kabushiki Kaisha, Osaka, Japan

[21] Appl. No.: 829,616

[22] Filed: Mar. 31, 1997

Related U.S. Application Data

[63] Continuation of Ser. No. 720,691, Oct. 1, 1996, abandoned, which is a continuation of Ser. No. 363,310, Dec. 22, 1994, abandoned, which is a continuation of Ser. No. 72,437, Jun. 7, 1993, abandoned.

[30] Foreign Application Priority Data

| Jun. 9, 1992 | [JP] | Japan | 4-149573 |
| Jun. 9, 1992 | [JP] | Japan | 4-149574 |
| Aug. 26, 1992 | [JP] | Japan | 4-227258 |
| Apr. 9, 1993 | [JP] | Japan | 5-083567 |

[51] Int. Cl.$^6$ ............................. C08L 51/00; C08L 53/00
[52] U.S. Cl. ............................. 525/84; 525/71; 525/86; 525/85; 525/240; 525/902; 524/451; 524/426
[58] Field of Search .................... 525/84, 85, 86, 525/902, 240, 71; 524/451, 426

[56] References Cited

U.S. PATENT DOCUMENTS

| 3,793,402 | 2/1974 | Owens | 525/81 |
| 3,808,180 | 4/1974 | Owens | 525/291 |
| 3,985,703 | 10/1976 | Ferry et al. | 523/201 |
| 3,985,704 | 10/1976 | Jones et al. | 523/342 |
| 4,180,494 | 12/1979 | Fromuth et al. | 523/201 |
| 4,278,576 | 7/1981 | Goldman | 260/23 |
| 4,520,164 | 5/1985 | Liu | 525/67 |
| 4,617,329 | 10/1986 | Weese et al. | 523/201 |
| 4,997,884 | 3/1991 | Ilenda et al. | 525/71 |
| 5,055,529 | 10/1991 | Kishida et al. | 525/85 |
| 5,094,806 | 3/1992 | Laughner | 525/240 |
| 5,210,135 | 5/1993 | Eichenauer et al. | 525/85 |
| 5,237,004 | 8/1993 | Wu et al. | 525/85 |
| 5,281,664 | 1/1994 | Golovoy et al. | 525/64 |

FOREIGN PATENT DOCUMENTS

| 0068357 | 1/1983 | European Pat. Off. . |
| 0422770 | 4/1991 | European Pat. Off. . |
| 0480698 | 4/1992 | European Pat. Off. . |
| 2347406 | 4/1977 | France . |

OTHER PUBLICATIONS

European Search Report in European Patent Appln. No. 93 10 9167 mailed Aug. 2, 1994.

*Primary Examiner*—Mark L. Warzel
*Attorney, Agent, or Firm*—Varndell Legal Group

[57] ABSTRACT

A polyolefin resin composition which comprises:
(A) a polyolefin,
(B) 0.1 to 100 parts of a core-shell graft copolymer prepared by graft copolymerizing (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber-like polymer having a glass transition temperature of not more than 25° C., and
(C) 0 to 400 parts of an inorganic filler, said parts of (B) and (C) being parts by weight per 100 parts by weight of (A). The above-mentioned polyolefin resin composition shows the excellent processability, impact resistance, rigidity and surface property.

26 Claims, No Drawings

POLYOLEFIN RESIN COMPOSITION, PROCESS FOR THE PREPARATION THEREOF AND MOLDED ARTICLE MADE THEREOF

This application is a continuation of Ser. No. 08/720,691, filed Oct. 1, 1996, now abandoned, which is a continuation of Ser. No. 08/363,310, filed Dec. 22, 1994, now abandoned, which is a continuation of Ser. No. 08/072,437, filed Jun. 7, 1993, now abandoned.

BACKGROUND OF THE INVENTION

The present invention relates to a polyolefin resin composition, a process for the preparation thereof and a molded article made thereof. More particularly, the present invention relates to a polyolefin resin composition excellent in processability, impact resistance, rigidity, surface property and the like, a process for the preparation thereof and a molded article thereof.

Hitherto, a polyolefin has been widely used for preparing, for example, various molded articles because it is inexpensive and excellent in physical properties.

However, because polypropylene, which is a representative example of a polyolefin, is poor in viscosity and tensile strength of the molten polypropylene, polypropylene is poor in vacuum formability (hereinafter, referred to as "thermoformability"), calender moldability, blow moldability, expansion moldability and the like when being molded into a sheet. Furthermore, in comparison with other polymers and resins such as polystyrene, poly(vinyl chloride) and ABS resin, polypropylene is poor in rigidity, low temperature impact resistance, surface property such as surface glossiness, hardness and paintability of a product therefrom, and thus poor in processability.

In order to improve the processability of the above-mentioned polypropylene, in general, polyethylene is mechanically mixed therewith. However, because the processability improving effect of polyethylene is insufficient, a large amount of polyethylene is required to improve the processability and therefore the rigidity of the obtained mixture lowers.

In order to improve the viscosity and the tensile strength of a molten polyolefin, the molecular weight of the polyolefin is attemped to become increased. However, the polyolefin having a large molecular weight is difficult to be processed by extrusion molding which is one of important processings of a polyolefin.

It is proposed, for example, in U.S. Pat. No. 4,156,703 that a non-crosslinked acrylic polymer is added to polyethylene to improve the processability. However, compatibility of polyethylene and the acrylic polymer is not sufficient. Furthermore, because the acrylic polymer is not crosslinked, the acrylic polymer is separated from the polyolefin and adhere to the surface of a calender roll or the surface of die of an extruder (hereinafter, referred to as "plate out") on calendering or extrusion. Thus the processability rather lowers.

In order to improve the low rigidity of a polyolefin itself and the lowering of the rigidity owing to the incorporation of polyethylene, it has been attemped that an inorganic filler is added to the polyolefin. However, the inorganic filler is poor in compatibility with the polyolefin and therefore uniform dispersing cannot be done. Therefore when such polyolefin added with the inorganic filler is used for preparing a sheet by extrusion, the surface property of the sheet considerably lowers.

In order to improve the impact resistance of a polyolefin, generally a rubber component such as ethylene-propylene rubber is introduced by mechanically mixing or block copolymerization. However, the introduction of the rubber component to the polyolefin by mechanical mixing or block copolymerization has the following defects. It is difficult to control the particle size of the particles to be dispersed and, therefore, the rubber introduced does not efficiently serve to improve the impact resistance, thus the effect of improving impact resistance is insufficient. Moreover because a large amount of the rubber component is required to improve the impact resistance, the rigidity of the obtained mixture lowers. Furthermore, the surface glossiness of the obtained molded article lowers because of the large particle size of the dispersed rubber component.

By using a core-shell type modifier which has hitherto widely been used as an agent for improving the impact resistance in a resin such as a poly(vinyl chloride) resin, a rubber component (core) having a predetermined particle diameter can be efficiently dispersed in the resin composition. So the core-shell type modifier can prevent lowering of the rigidity and improve the impact resistance of the obtained molded article. However, the core-shell type modifier is hardly usable with a polyolefin because the polyolefin is non-polar and therefore the compatibility of the core-shell type modifier with the polyolefin is low.

It is proposed, for example, in Japanese Unexamined Patent Publication No. 185037/1991 and U.S. Pat. No. 4,997,884, that the above-mentioned core-shell type modifier is added to a polyolefin in the presence of a specific compatibilizer. However, the above-mentioned compatibilizer is synthesized by a complicated process and therefore the cost becomes high and the system for synthesis is also complicated.

Thus, there has not yet been proposed a polyolefin resin composition which satisfies all of properties such as excellent processability, impact resistance, rigidity and surface property.

An object of the invention is to provide a polyolefin resin composition which satisfies all of the above-mentioned properties.

This and other objects of the present invention will become apparent from the description hereinafter.

SUMMARY OF THE INVENTION

It has been found that a polyolefin resin composition satisfying all of the above-mentioned properties can be obtained when a polypropylene is mixed with a core-shell graft copolymer prepared from a specific crosslinked rubber-like polymer and a monomer component, and an inorganic filler.

In accordance with the present invention, there are provided a polyolefin resin composition which comprises:

(A) a polyolefin, (B) 0.1 to 100 parts of a core-shell graft copolymer prepared by graft copolymerizing (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber-like polymer having a glass transition temperature of not more than 25° C., and (C) 0 to 400 parts of an inorganic filler, said parts of (B) and (C) being parts by weight per 100 parts by weight of (A).

The present invention also provides a process for preparing a polyolefin resin composition which comprises mixing a part of a polyolefin (A) with 0.1 to 100 parts by weight of a core-shell graft copolymer (B) per 100 parts by weight of said polyolefin (A) to give a masterbatch, and mixing said masterbatch with the rest of said polyolefin (A) and 0 to 400 parts by weight of an inorganic filler (C) per 100 parts by weight of said polyolefin (A), said core-shell graft copolymer (B) being a graft copolymerization product of (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber-like polymer having a glass transition temperature of not more than 25° C.

The composition according to the present invention can be molded into various articles such as film, sheet, hollow article, foam and the like by calendering, extrusion, thermoforming, injection molding, blow molding, expansion molding and other known molding methods.

DETAILED DESCRIPTION

The polyolefin resin composition of the present invention is, as described above, prepared by mixing 100 parts by weight of a polyolefin (A) with 0.1 to 100 parts by weight of a core-shell graft copolymer (B) and 0 to 400 parts by weight of an inorganic filler (C), said core-shell graft copolymer (B) being a graft copolymerization product of (b) 5 to 60 parts by weight of a monomer component Comprising a copolymerizable vinyl compound selected so that the glass transition temperature of a polymer of the monomer component alone is not less than 25° C., onto (a) 40 to 95 parts by weight of a crosslinked rubber-like polymer having a glass transition temperature of not more than 25° C.

The reason why the polyolefin resin composition of the present invention shows all of the properties such as excellent processability, impact resistance, rigidity and surface property is understood as follows.

By mixing the above-mentioned polyolefin (A) with the core-shell graft copolymer (B), the die swell lowers. In particular, by mixing a part of the polyolefin (A) with whole amount of the core-shell graft copolymer (B) to be used, to give a masterbatch, and then mixing the masterbatch with the rest of the polyolefin (A) and whole mount of the inorganic filler (C) to be used, the dispersibility of the core-shell graft copolymer (B) in the polyolefin (A) is further improved and the tensile strength of the obtained mixture in a molten state increases. Thus the draw-down of the molten resin is improved. Therefore the obtained polyolefin resin composition shows improved processability, impact resistance and surface property.

Although hitherto a core-shell type graft copolymer cannot be compatible with a polyolefin in the absence of a compatibilizer, a core-shell type graft copolymer of the present invention is compatible with the polyolefin without any compatibilizer. Thus the core-shell type graft copolymer of the present invention acts as an agent for improving the processability of the polyolefin and the impact resistance of the obtained molded article, and also improves the dispersibility of the inorganic filler. The reason is considered that in the conventional core-shell type graft copolymer a shell layer is compatible with a matrix resin to be mixed, while in the present invention, utterly different from the conventional type, a core of the core-shell graft copolymer (B), namely a rubber component having a specific glass transition temperature is compatible with polyolefin (A).

When processing the resin composition obtained by mixing the above-mentioned polyolefin (A) with the core-shell graft copolymer (B), the core-shell graft copolymer (B) does not plate out on the surface of a calender roll or a surface of die of an extruder in the present invention, because the above-mentioned rubber component has no stickiness to the metallic surface at a high temperature. The reason is considered not only that the core layer, namely the rubber component having a glass transition temperature of not more than 25° C., is crosslinked, but also that a hard component having a glass transition temperature of not less than 25° C. is graft copolymerized as a shell layer onto the crosslinked polymer.

Representative examples of the polyolefin (A) used in the present invention are, for instance, polypropylene, high density polyethylene, low density polyethylene, linear low density polyethylene, poly-1-butene, polyisobutylene, a random or block copolymer of propylene and ethylene and/or 1-butene in any ratio, a terpolymer of ethylene, propylene and at most 10% weight of a diene wherein ethylene and propylene may by be present in any ratio, polymethylpentene, a random, block or graft copolymer of ethylene or propylene with not more than 50% by weight of a vinyl compound such as a vinyl acetate, an alkyl acrylate or an aromatic vinyl compound, and the like. They may be used alone or in admixture thereof.

In the present invention, as the polyolefin. (A) a propylene polymer prepared by polymerizing monomers containing not less than 50% by weight of propylene, and a mixture of the propylene polymer and 0 to 100 parts by weight of polyethylene per 100 parts by weight of the above-mentioned propylene polymer, are preferable from the viewpoint of availability and inexpensiveness. Also, as the polyolefin (A), a polyolefin having a melt flow index of not more than 4 g/10 minutes, particularly 0.1 to 3 g/10 minutes, at 230° C. is preferable, since effects such as excellent kneadability and dispersibility with the core-shell graft copolymer (B), the inorganic filler (C) and the like, and the large tensile strength in a molten state, are sufficiently produced.

In the present invention, a core-shell graft copolymer (B) is used in order to improve the impact resistance and the processability of the above-mentioned polyolefin (A). The core-shell graft copolymer comprises the core of the crosslinked elastomeric polymer having a glass transition temperature of not more than 25° C. and the shell layer of the hard layer comprising a vinyl compound selected so that the glass transition temperature of a polymer of the vinyl compound alone is not less than 25° C. Furthermore, the core-shell graft copolymer in the present invention includes a graft copolymer prepared by graft copolymerizing the hard shell component in the presence of the crosslinked rubber-like polymer which forms the core.

The core-shell graft copolymer (B) used in the present invention can be prepared by graft copolymerizing (b) the monomer component comprising a copolymerizable vinyl compound selected so that the glass transition temperature of a polymer of the monomer component alone is not less than 25° C. (hereinafter, referred to as "monomer component (b)"), onto (a) the crosslinked rubber-like polymer having a glass transition temperature of not more than 25° C. (hereinafter, referred to as "crosslinked rubber-like polymer (a)").

In the present invention, the glass transition temperature of the crosslinked rubber-like polymer (a) is not more than 25° C., as above-described. When the glass transition temperature is more than 25° C., the effect of improving the processability, impact resistance and the like, which is caused by the core-shell graft copolymer (B), lowers.

The glass transition temperature of a polymer of the monomer component (b) alone is, as described above, not less than 25° C. When the glass transition temperature is less than 25° C., the core-shell graft copolymer (B) coagulates into a mass.

The above-mentioned glass transition temperature and the determining method thereof are described in, for example, Polymer Handbook, second edition, a Wiley interscience publication (1975). In the present invention, a value calculated according to the following equation was employed as the glass transition temperature of a copolymer.

$$1/Tg = Wx/Tgx + Wy/Tgy$$

Tg: Glass transition temperature (°C.) of the copolymer of components (x) and (y)

Tgx: Glass transition temperature (°C.) of the component (x)

Tgy: Glass transition temperature (°C.) of the component (y)

Wx: Weight (%) of the component (x)

Wy: Weight (%) of the component (y)

Representative examples of the above-mentioned crosslinked rubber-like polymer (a) are, for instance, a diene rubber, an acrylic rubber, an olefin rubber, a silicone rubber and the like. Among these examples, a diene rubber and an acrylic rubber are preferable from the viewpoint of inexpensiveness, emulsion-polymerizability and easiness in designing of a particle structure, and an acrylic rubber is more preferable from the viewpoint of excellent heat stability.

Representative examples of the above-mentioned diene rubber are, for instance, a diene rubber comprising 60 to 100% by weight of a diene compound and 0 to 40% by weight of a copolymerizable other vinyl compound therewith, and the like.

Representative examples of the diene compound used in the above-mentioned diene rubber are, for instance, butadiene, iso-prene, chloroprene and the like. Though they may be used alone or in admixture thereof, among these examples butadiene is preferable from the viewpoint of inexpensiveness, excellent compatibility of the obtained core-shell graft copolymer (B) with the polyolefin (A) and excellent effect of improving the processability and the impact resistance.

Representative examples of other vinyl compound copolymerizable with the above-mentioned diene compound are, for instance, an aromatic vinyl compound such as styrene or α-methylstyrene; an alkyl methacrylate having a $C_1$ to $C_{22}$ alkyl group such as methyl methacrylate, ethyl methacrylate, n-butyl methacrylate, i-butyl methacrylate, t-butyl methacrylate, 2-ethylhexyl methacrylate or stearyl methacrylate; an alkyl acrylate having a $C_1$ to $C_{22}$ alkyl group such as methyl acrylate, ethyl acrylate, n-butyl acrylate, i-butyl acrylate, t-butyl acrylate, 2-ethylhexyl acrylate or steraryl acrylate; an unsaturated nitrile compound such as acrylonitrile or methacrylonitrile; and a vinyl compound having a reactive functional group such as an acid anhydride group, carboxyl group, amino group or hydroxyl group, e.g. maleic anhydride, methacrylic acid, acrylic acid, methacrylamide, acrylamide, dimethylaminoethyl -methacrylate, hydroxyethyl methacrylate or hydroxyethyl acrylate and the like. Though they may be used alone or in admixture thereof, among these examples styrene and n-butyl acrylate are preferable from the viewpoint of inexpensiveness, excellent compatibility of the obtained core-shell graft copolymer (B) with the polyolefin (A) and excellent effect of improving the processability and the impact resistance.

The amount of the diene compound and other vinyl compound copolymerizable therewith to be used in the above-mentioned diene rubber is 60 t 100% by weight of the diene compound and 0 to 40% by weight of the vinyl compound, preferably 70 to 100% by weight of the diene compound and 0 to 30% by weight of the vinyl compound. When the amount of the diene compound is less than 60% by weight, namely the amount of other vinyl compound is more than 40% by weight, the compatibility of the obtained core-shell graft copolymer (B) and the polyolefin (A), and effect of improving the processability and the impact resistance tend to lower.

Representative examples of the above-mentioned acrylic rubber are, for instance, an acrylic rubber comprising 60 to 100% by weight of an alkyl acrylate having a $C_2$ to $C_{22}$ alkyl group and 0 to 40% by weight of other vinyl compound copolymerizable therewith and the like.

Representative examples of the alkyl acrylate having a $C_2$ to $C_{22}$ alkyl group used in the above-mentioned acrylic rubber are, for instance, ethyl acrylate, n-butyl acrylate, i-butyl acrylate, t-butyl acrylate, 2-ethylhexyl acrylate, Stearyl acrylate and the like. Though they may be used alone or in admixture thereof, among these examples n-butyl acrylate and 2-ethylhexyl acrylate are preferble from the viewpoint of inexpensiveness, excellent compatibility of the obtained core-shell graft copolymer (B) with the polyolefin (A) and excellent effect of improving the processability and the impact resistance.

Representative examples of other vinyl compound copolymerizable with the above-mentioned alkyl acrylate are, for instance, the aromatic vinyl compound exemplified as the vinyl compound copolymerizable with the above-mentioned diene compound; an alkyl methacrylate having a $C_2$ to $C_{22}$ alkyl group such as methyl methacrylate, ethyl methacrylate, n-butyl methacrylate, i-butyl methacrylate, t-butyl methacrylate, 2-ethylhexyl methacrylate or stearyl methacrylate; methyl acrylate; an unsaturated nitrile compound such as acrylonitrile or methacrylonitrile; a vinyl compound having a reactive functional group such as an acid anhydride group, carboxyl group, amino group or hydroxyl group e.g. maleic anhydride, methacrylic acid, acrylic acid, methacrylamide, acrylamide, dimethylaminoethyl methacrylate, hydroxyethyl methacrylate or hydroxyethyl acrylate, and the like. They may be used alone or in admixture thereof. Among these examples, styrene and methyl methacrylate are preferable from the viewpoint of excellent effect of improving the processability of the obtained core-shell graft copolymer (B) and inexpensiveness.

The amount of the alkyl acrylate having a $C_2$ to $C_{22}$ alkyl group and other vinyl compound copolymerizable with the alkyl acrylate to be used in the above-mentioned acrylic rubber is 60 to 100% by weight of the alkyl acrylate and 0 to 40% by weight of the vinyl compound, preferably 65 to 100% by weight of the alkyl acrylate and 0 to 35% by weight of the vinyl compound. When the mount of the alkyl acrylate is less than 60% by weight, namely the amount of the vinyl compound is more than 40% by weight, the compatibility of the obtained core-shell graft copolymer (B) with the polyolefin (A), and effect of improving the processability and the impact resistance tend to lower.

Examples of the above-mentioned olefin rubber are, for instance, ethylene-propylene-diene rubber, butyl rubber and the like. Examples of the above-mentioned silicone rubber are, for instance, polydimethylsiloxane rubber and the like.

The crosslinked rubber-like polymer (a) can be prepared by crosslinking a rubber-like polymer such as the above-mentioned diene rubber, acrylic rubber, olefin rubber or silicone rubber.

The method for the above-mentioned crosslinking is not particularly limited. The method can be suitably selected, according to a kind of the used rubber-like polymer, from various conventional methods, for instance, a method utilizing self-crosslinking of butadiene, a method using a multifunctional crosslinking agent such as divinylbenzene or 1,3-butanediol dimethacrylate, a method using a graftlinking agent such as allyl methacrylate, allyl acrylate or diallyl phthalate, a method using a peroxide, and the like. In case of crosslinking the acrylic rubber, it is preferable to select and use the method using a multifunctional crosslinking agent with a graftlinking agent or the method using a graftlinking agent by reason that active site for grafting is produced when crosslinking and graft copolymerization are simultaneously carried out.

Thus obtained crosslinked rubber-like polymer (a) is prepared preferably so as to have not less than 50% by weight, more preferably so as to have not less than 60% by weight of gel fraction caused by crosslinking (hereinafter referred to as "gel fraction"). In case that the above-mentioned gel fraction is less than 50% by weight, if thus obtained polyolefin resin composition is used for, e.g., calendering, the composition tends not to show the sufficient effect of improving the processability owing to the plate out thereof onto a calender roll.

The above-mentioned gel fraction is a ratio of insoluble matter which is separated by centrifuging a mixture obtained by immersing the crosslinked rubber-like polymer into a good solvent for the rubber component, such as toluene or ethyl methyl ketone for 48 hours.

Representative examples of the above-mentioned monomer component (b) are, for instance, the aromatic vinyl compound exemplified as the vinyl compound copolymerizable with the diene compound in the above-mentioned crosslinked rubber-like polymer (a); an alkyl methacrylate having a $C_1$ to $C_{22}$ alkyl group such as methyl methacrylate, ethyl methacrylate, n-butyl methacrylate, i-butyl methacrylate, t-butyl methacrylate, 2-ethylhexyl methacrylate or stearyl methacrylate; an alkyl acrylate having a $C_1$ to $C_{22}$ alkyl group such as methyl acrylate, ethyl acrylate, n-butyl acrylate, i-butyl acrylate, t-butyl acrylate, 2-ethylhexyl acrylate or steraryl acrylate; an unsaturated nitrile compound such as acrylonitrile or methacrylonitrile; a vinyl compound having a reactive functional group such as an acid anhydride group, carboxyl group, amino group or hydroxyl group e.g. maleic anhydride, methacrylic acid, acrylic acid, methacrylamide acrylamide, dimethylaminoethyl methacrylate, hydroxyethyl methacrylate or hydroxyethyl acrylate, and the like. They may be used alone or in admixture thereof.

The above-mentioned monomer component (b) preferably comprises 50 to 100% by weight of the above-mentioned aromatic vinyl compound and/or the alkyl methacrylate and 0 to 50% by weight of other vinyl compound copolymerizable therewith, by reason that it is hard to cause a lowering of polymerizability and cost up.

From the viewpoint of good polymerizability and inexpensiveness, it is particularly preferable to use styrene and α-methylstyrene as the above-mentioned aromatic vinyl compound, and to use an alkyl methacrylate having a $C_1$ to $C_8$ alkyl group as the alkyl methacrylate.

The above-mentioned core-shell graft copolymer (B) can be prepared by graft copolymerizing the monomer component (b) onto the crosslinked rubber-like polymer (a).

The amount of the above-mentioned monomer component (b) to be used is 5 to 60 parts by weight per 40 to 95 parts by weight of the above-mentioned crosslinked rubber-like polymer (a), preferably 10 to 60 parts by weight per 40 to 90 parts by weight of the above-mentioned crosslinked rubber-like polymer (a).

When the amount of the crosslinked rubber-like polymer (a) is less than 40 parts by weight, namely the amount of the monomer component (b) is more than 60 parts by weight, the effect of improving the processability and the impact resistance which is caused by the resulting core-shell graft copolymer (B) comes to lower. On the contrary, when the amount of the crosslinked rubber-like polymer (a) is more than 95 parts by weight, namely the amount of the monomer component (b) is less than 5 parts by weight, the resulting core-shell graft copolymer (B) comes to coagulate into a mass.

The above-mentioned core-shell graft copolymer (B) can be polymerized by means of a conventional method for radical polymerization such as suspension polymerization or emulsion polymerization. Among these examples, the emulsion polymerization is preferable from the viewpoint of control of particle size, particle structure and the like.

Also, particles of the resulting core-shell graft copolymer (B) in the present invention can be enlarged by adding an acid, a salt, an agent for coagulation, and the like in polymerization step.

A mean particle diameter of thus obtained core-shell graft copolymer (B) is preferably not more than 3 μm, more preferably not more than 2.5 μm on purpose to improve surface property of the resulting polyolefin resin composition.

The inorganic filler (C) used in the present invention has function of improving rigidity, paintability and printability, and the like of the resulting polyolefin resin composition. Representative examples of the inorganic filler (C) are, for instance, heavy calcium carbonate, light calcium carbonate, talc, glass fiber, magnesium carbonate, mica, kaolin, calcium sulfate, barium sulfate, titanium white, white carbon, carbon black, aluminium hydroxide, magnesium hydroxide and the like. They can be used alone or in admixture thereof. Among these examples, heavy calcium carbonate, light calcium carbonate and talc are preferable from the viewpoint of availability. The mean particle diameter of the above-mentioned inorganic filler (C) is preferably not more than about 10 μm, more preferably not more than about 5 μm. When the mean particle diameter of the inorganic filler (C) is more than 10 μm, the surface property of the resulting polyolefin resin composition tends to deteriorate.

The polyolefin resin composition of the present invention can be prepared by mixing the polyolefin (A) with the core-shell graft copolymer (B) and the inorganic filler (C).

The amount of the above-mentioned polyolefin (A), core-shell graft copolymer (B) and inorganic filler (C) to be used is 0.1 to 100 parts by weight of the core-shell graft copolymer (B) and 0 to 400 parts by weight of the inorganic filler (C), preferably 0.5 to 70 parts by weight of the core-shell graft copolymer (B) and 0 to 300 parts by weight of the inorganic filler (C), per 100 parts by weight of the polyolefin (A). When the amount of the above-mentioned core-shell graft copolymer (B) is less than 0.1 part by weight, there insufficiently appears the effect of improving processability and surface property caused by the core-shell graft copolymer (B). In contrast, when the amount of the core-shell graft copolymer (B) is more than 100 parts by weight, the original character of the polyolefin (A) comes to decline. When the amount of the above-mentioned inorganic filler (C) is more than 400 parts by weight, the surface property of the resulting polyolefin resin composition comes to deteriorate.

In mixing the above-mentioned polyolefin (A) and core-shell graft copolymer (B) and inorganic filler (C) in the present invention, it is preferable to previously mix a part of the polyolefin (A) and the core-shell graft copolymer (B) to give a masterbatch and then mix thus obtained masterbatch with the rest of the polyolefin (A) and the inorganic filler (C), by reason that dispersibility of the core-shell graft copolymer (B) is further improved.

The amount of the part of the polyolefin (A) to be previously mixed with the core-shell graft copolymer (B), is preferably 0.1 to 80% by weight, more preferably 0.1 to 70% by weight per 100% by weight of the whole amount of the polyolefin (A) from the viewpoint of excellent mixing property.

The amount of the polyolefin (A) and the core-shell graft copolymer (B) to be used in the above-mentioned preparation of masterbatch is preferably 5 to 95% by weight of the polyolefin (A) and 5 to 95% by weight of the core-shell graft copolymer (B), more preferably 5 to 80% by weight of the polyolefin (A) and 20 to 95% by weight of the core-shell graft copolymer (B). When the amount of the polyolefin (A) is less than 5% by weight, namely the amount of the core-shell graft copolymer (B) is more than 95% by weight, there appears tendency that viscosity comes to increase and therefore mixing comes to be difficult. In contrast, when the amount of the polyolefin (A) is more than 95% by weight, namely the amount of the core-shell graft copolymer (B) is less than 5% by weight, effect of improving dispersibility tends to lower.

The method for preparing a masterbatch by previously mixing a part of the polyolefin (A) and the core-shell graft copolymer (B), is not particularly limited. They are mixed by an extruder, a mixing roll or other mixing machine. Among these examples, it is preferable to mix them by an extruder from the viewpoint of productivity.

The method for mixing thus obtained masterbatch with the rest of the polyolefin (A) and the inorganic filler (C) is not particularly limited. It is preferable to suitably select the mixing machine such as an extruder or a mixing roll according to the use of the polyolefin resin. In the present invention, the polyolefin resin composition can be also prepared by a mixing method comprising multiple steps, for instance, a method by mixing a part of the polyolefin (A) and the inorganic filler (C), and then adding the rest of the polyolefin (A) and the core-shell graft copolymer (B) thereto to mix them, or the like.

The polyolefin resin composition of the present invention can be prepared as described above. To the polyolefin resin composition may be further added, as occasion demands, for instance, a stabilizer, a lubricant, a core-shell type agent for improving processability used in the known poly(vinyl chloride) resin etc., and the like.

Representative examples of the above-mentioned stabilizer are, for instance, a phenol stabilizer such as pentaerythrityl-tetrakis[3-(3,5-di-t-butyl-4-hydroxyphenyl) propionate] or triethyleneglycol-bis[3-(3-t-butyl-5-methyl-4-hydroxyphenyl)propionate], a phosphorous stabilizer such as tris(monononylphenyl)phosphate or tris(2, 4-di-t-butylphenyl)phosphate, a sulfur stabilizer such as dilaurylthiodipropionate, and the like. They can be used alone or in admixture thereof. The amount of the stabilizer to be used is conventionally about 0.01 to 3 parts by weight, preferably about 0.05 to 2 parts by weight per 100 parts by weight of the polyolefin (A).

Representative examples of the above-mentioned lubricant are, for instance, a salt such as a sodium salt, a calcium salt or a magnesium salt with a saturated or unsaturated fatty acid such as lauric acid, palmitic acid, oleic acid or stearic acid, and the like. They can be used alone or in admixture thereof. The amount of the lubricant to be used is conventionally about 0.1 to 3 parts by weight, preferably about 0.1 to 2 parts by weight per 100 parts by weight of the polyolefin (A).

Addition of the above-mentioned stabilizer, lubricant, agent for improving processability and the like may be carried out during preparing the above-mentioned masterbatch, or during mixing the masterbatch with the rest of the polyolefin (A) and the inorganic filler (C); and is not particularly limited.

The polyolefin resin composition of the present invention shows remarkably improved excellent processability, impact resistance, rigidity, surface property and the like. Therefore, by using the polyolefin resin composition of the present invention can be prepared useful molded articles by means of various molding methods including molding methods by which it has been difficult to mold the known polyolefin resin compositions.

Examples of the molding method usable in the present invention are, for instance, calender molding, extrusion molding, thermoforming, injection molding, blow molding, expansion molding and the like.

For instance, from the polyolefin resin composition of the present invention can be prepared molded articles in the form of film or sheet by calendering or extrusion molding. Further, another molded article can be prepared by thermoforming thus obtained film or sheet at a temperature suitable for the used polyolefin resin composition. Also, it is possible to prepare an injection molded article or a hollow article by injection molding or blow molding, respectively, from e.g., a pellet obtained by extruding the above-mentioned composition.

Furthermore, a foam can be prepared by adding a blowing agent to the polyolefin resin composition of the present invention and then expansion-molding the mixture with e.g., an extruder or the like.

Representative examples of the above-mentioned blowing agent are, for instance, a halogenated hydrocarbon e.g. trichloromonofluoromethane, methylene chloride, methyl chloride, dichlorodifluoromethane, dichloromonofluoromethane, monochlorodifluoromethane, dichlorotetrafluoroethane or trichlorotrifluoroethane, an aliphatic hydrocarbon e.g. propane, butane, pentane or hexane, an alcohol, an ester, a ketone, an ether, a chemical blowing agent e.g. sodium hydrogencarbonate, azodicarbonamide, N,N-dinitrosopentamethylenetetramine, p-toluenesulfonyl semicarbazide, and the like. They can be used alone or in admixture thereof. Among these examples, it is preferable to use an organic volatile type blowing agent of which boiling point is about −40° to 60° C. under ordinary pressure, such as trichloromonofluoromethane or dichlorotetrafluoroethane alone or in admixture thereof. The amount of the blowing agent to be used is not particularly limited. It is preferable to use conventionally about 3 to 50 parts by weight of the blowing agent per 100 parts by weight of the polyolefin resin composition of the present invention, The present invention is more specifically described and explained by means of the following Examples and Comparative Examples in which all percents and parts are by weight unless otherwise noted. It is to be understood that the present invention is not limited to the Examples, and various changes and modifications may be made in the invention without departing from the spirit and scope thereof.

EXAMPLE 1

Butadiene was emulsion polymerized to give a crosslinked polybutadiene rubber latex. The crosslinked polybutadiene rubber had a glass transition temperature of −85° C., a mean particle diameter of 0.25 μm and a gel fraction of 85%.

To 70 parts (solid matter) of the above-mentioned crosslinked polybutadiene rubber latex was added 30 parts of a monomer component comprising 15 parts of methyl methacrylate and 15 parts of styrene (glass transition temperature of a polymer of the monomer component: 100° C.). Thus obtained mixture was graft copolymerized by emulsion polymerization to give a core-shell graft copolymer (hereinafter referred to as "graft copolymer (B)-1") latex. A final conversion was 98%. A mean particle diameter of the graft copolymer (B)-1 was 0.26 μm.

The obtained graft copolymer (B)-1 latex was salted out, dehydrated and dried to give a powder. Twenty parts of the resulting graft copolymer (B)-1 in a form of powder was mixed with 100 parts of a polypropyrene (trade name: Hipol-B-200, available from MITSUI PETROCHEMICAL INDUSTRIES, LTD, melt flow index at 230° C.: 0.5 g/10 minutes) (hereinafter referred to as "PP"). Thus obtained mixture was kneaded and extruded by using a twin screw extruder (screw diameter: 44 mm, L/D: 30) at 200° C., 100 rpm to give a pellet.

A melting tensile strength and a melt flow index at 230° C. of the obtained pellet were measured according to the following methods. The results are shown in Table 1.

Melting tensile strength

By using a Capirograph (available from Toyo Seiki Seisaku-Sho, Ltd.) with dies (2 mm×10 mm), a melting tensile strength (g) was measured at 200° C., an extrusion speed of 20 mm/minute and a draw speed of testing of 1 m/minute.

Melt flow index (at 230° C.)

According to ASTM-D 1238, a melt flow index (g/10 minutes) was measured at 230° C.

Then, thus obtained pellet was kneaded for 3 minutes by rolls at 200° C. to give a rolled sheet. The rolled sheet was press molded to give a test piece which applies to each of ASTM-D256 and ASTM-D790.

As appearance of the above-mentioned rolled sheet in kneading by rolls, surface condition, presence of thermal discoloration and presence of plate out on the roll surface were observed with the naked eye, and estimated according to the following criterion for evaluation. The results are shown in Table 1.

(Criterion for Evaluation)

Surface condition of rolled sheet

A: Even surface and excellent glossiness

B: A little rough surface and a little poor glossiness

C: Remarkably uneven surface and poor glossiness

Thermal discoloration of rolled sheet

A: No thermal discoloration

B: Slight thermal discoloration

C: Remarkable thermal discoloration

Plate out on roll surface

A: No plate out

B: Slight plate out

C: Remarkable plate out

Impact resistance and flexural elasticity

The above-mentioned test piece was subjected to each of the test method for Izod impact resistance and the test for flexural elasticity according to ASTM-D 256 and ASTM-D790. The results are shown in Table 1.

Draw down of sheet The pellet was kneaded in the same manner as described above to prepare a sheet (100 mm×100 mm, thickness: 1.5 mm). The prepared sheet was fixed with a clamp having an opening of 76 mm×76 mm. Then, the fixed sheet was heated in an oven of which temperature was 190° C. for 30 minutes to measure draw down (mm) of the sheet. The results are shown in Table 1.

EXAMPLE 2

Monomer components of 70 parts of butadiene and 30 parts of styrene were emulsion polymerized to give a crosslinked diene rubber latex. The crosslinked diene rubber had a glass transition temperature of −50° C., a mean particle diameter of 0.1 μm and a gel fraction of 80%.

Then, in the same manner as described in Example 1 except that 70 parts (solid matter) of thus obtained crosslinked diene rubber latex was used instead of the crosslinked polybutadiene rubber latex, a core-shell graft copolymer (hereinafter referred to as "graft copolymer (B)-2") was prepared. A final convention was 98%. A mean particle diameter of the graft copolymer (B)-2 was 0.12 μm.

Further, in the same manner as described in Example 1 except that the above-mentioned graft copolymer (B)-2 was used instead of the graft copolymer (B)-1, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

EXAMPLES 3 AND 4

In the same manner as described in Example 1 except that the amount of the used graft copolymer (B)-1 was changed into 50 parts (Example 3) or that the amount of the us ed graft copolymer (B)-1 was changed into 70 parts (Example 4), a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

EXAMPLE 5

Monomer components of 100 parts of n-butyl acrylate and 1 part of allyl methacrylate were emulsion polymerized to give a crosslinked poly(butyl acrylate) rubber latex. The crosslinked poly(butyl acrylate) rubber had a glass transition temperature of −55° C., a mean particle diameter of 0.2 μm and a gel fraction of 85%.

To 70 parts (solid matter) of the above-mentioned crosslinked poly(butyl acrylate) rubber latex was added 30 parts of a monomer component comprising 27 parts of methyl methacrylate and 3 parts of n-butyl methacrylate (glass transition temperature of a polymer of the monomer component: 95° C.). Thus obtained mixture was graft copolymerized by emulsion polymerization to give a core-shell graft copolymer (hereinafter referred to as "graft copolymer (B)-3") latex. A final conversion was 98%. A mean particle diameter of the graft copolymer (B)-3 was 0.22 μm. The obtained graft copolymer (B)-3 latex was salted out, dehydrated and dried to give a powder.

Then, in the same manner as described in Example 1 except that the graft copolymer (B)-3 was used instead of the graft copolymer (B)-1, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

COMPARATIVE EXAMPLES 1 TO 3

In the same manner as described in Example 1 except that components shown in Table 1 were employed, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

COMPARATIVE EXAMPLE 4

A monomer component of 100 parts of butyl acrylate was emulsion polymerized to give a non-crosslinked poly(butyl acrylate) rubber latex. The non-crosslinked poly(butyl acrylate) rubber had a mean particle diameter of 0.2 μm and a gel fraction of 0%.

To 50 parts (solid matter) of the above-mentioned non-crosslinked poly(butyl acrylate) rubber latex was added 50 parts of methyl methacrylate, and a graft copolymerization was carried by emulsion polymerization to give a graft copolymer (hereinafter referred to as "graft copolymer (B)-4") latex. A final conversion was 98% and the graft copolymer (B)-4 had a mean particle diameter of 0.24 μm.

The obtained graft copolymer (B)-4 latex was salted out, dehydrated and dried to give a powder thereof.

In the same manner as described in Example 1 except that the above-mentioned graft copolymer (B)-4 was used instead of the graft copolymer (B)-1, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

COMPARATIVE EXAMPLE 5

A monomer component of 100 parts of methyl methacrylate was emulsion polymerized to give a polymer (hereinafter referred to as "polymer-5") latex. A final conversion was 98%. The polymer-5 had a mean particle diameter of 0.1 μm and a gel fraction of 0%. The obtained polymer-5 latex was salted out, dehydrated and dried to give a powder thereof.

In the same manner as described in Example 1 except that the above-mentioned polymer-5 was used instead of the graft copolymer (B)-1, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 1.

TABLE 1

| | Composition (part) | | | Physical properties | | | | | | | | |
|---|---|---|---|---|---|---|---|---|---|---|---|---|
| | | Core-shell graft | | Melting tensile | Melt flow index | Impact resistance | | Flexural | Draw | Appearance of rolled sheet | | Plate out |
| | Polyolefin | copolymer | | strength | (g/10 | (kg · cm/cm) | | elasticity | down | Surface | Thermal | on roll |
| | (A) | (B) | Other | (g) | minutes) | 23° C. | −20° C. | (kg/cm$^2$) | (mm) | condition | discoloration | surface |
| Example No. | | | | | | | | | | | | |
| 1 | PP (100) | (B)-1 (20) | — | 12 | 0.3 | 7 | 5 | 12000 | 20 | A | B | A |
| 2 | PP (100) | (B)-2 (20) | — | 12 | 0.4 | 6 | 4 | 12000 | 20 | A | B | A |
| 3 | PP (100) | (B)-1 (50) | — | 13 | 0 | 13 | 7 | 9000 | 0 | A | B | A |
| 4 | PP (100) | (B)-1 (70) | — | 15 | 0 | 20 | 10 | 6000 | 0 | A | B | A |
| 5 | PP (100) | (B)-3 (20) | — | 12 | 0.4 | 6 | 4 | 12000 | 20 | A | A | A |
| Comparative Example No. | | | | | | | | | | | | |
| 1 | PP (100) | — | — | 9 | 0.7 | 3 | 2 | 14000 | 90 | C | A | A |
| 2 | PP (100) LDPE (20) | — | — | 10 | 0.7 | 4 | 2 | 11000 | 40 | C | A | A |
| 3 | PP (100) LDPE (50) | — | — | 11 | 0.7 | 4 | 2 | 9000 | 30 | C | A | A |
| 4 | PP (100) | (B)-4 (20) | — | 9 | 0.6 | 4 | 2 | 11000 | 30 | C | A | C |
| 5 | PP (100) | — | polymer-5 (20) | 12 | 0.7 | 2 | 2 | 16000 | 30 | C | A | C |

LDPE shown in Table 1 means a low density polyethylene which has a melt flow index of 0.25 g/10 minutes at 190° C. (hereinafter the same).

The results shown in Table 1 show that each polypropylene mixed with a core-shell graft copolymer obtained in Examples 1 to 5 had excellent properties compared with polyolefin alone (Comparative Examples 1 to 3). That is, the mixture of the present invention showed a small melt flow index and a high melting tensile strength, and therefore draw down of the obtained sheet was small. Thus the processability was improved. In addition, surface condition of the rolled sheet in kneading by roll was excellent and any plate out on roll surface was not observed, and thus the surface property was significantly improved in each molded article obtained in Examples 1 to 5. Also, each molded article obtained in Examples 1 to 5 was excellent in balance between processability, impact resistance and rigidity (flexural elasticity).

In case that a graft copolymer comprising a non-crosslinked rubber-like polymer (Comparative Example 4) or a non-crosslinked acrylic polymer (Comparative Example 5) was used, it was shown that a practical molded article was not obtained because significant plate out on roll surface was observed and the surface condition of the rolled sheet was bad.

In addition, it was shown that in case of using a crosslinked acrylic rubber-like polymer obtained in Example 5, the obtained molded article was particularly excellent in heat stability because there was not any thermal discoloration.

EXAMPLE 6

In the same manner as described in Example 1 except that 50 parts of precipitated calcium carbonate (mean particle diameter: 0.15 μm) of which surface was treated with a fatty acid (hereinafter referred to as "(C)-1") together with 20 parts of a powder of the graft copolymer (B)-1 was mixed with 100 parts of PP, a pellet was prepared, and a rolled sheet, a test piece and a sheet were prepared therefrom.

In the same manner as described in Example 1, physical properties of each of thus obtained pellet, rolled sheet, test piece and sheet were examined. The results are shown in Table 2.

The above-mentioned pellet was extruded by using a single screw extruder (screw diameter: 50 mm, L/D: 20) with T die at 230° C. to give an extruded sheet having a width of 300 mm and a thickness of 0.5 mm.

As appearance of the obtained extruded sheet, surface condition was observed with the naked eye and estimated according to the same criterion for evaluation as in a rolled sheet. The results are shown in Table 2.

EXAMPLES 7 TO 9 AND COMPARATIVE EXAMPLES 6 TO 7

In the same manner as described in Example 6 except that the components shown in Table 2 were employed, a pellet was prepared, and a rolled sheet, a test piece, a sheet and an extruded sheet were prepared therefrom.

In the same manner as described in Example 6, physical properties of each of thus obtained pellet, rolled sheet, test piece, sheet and extruded sheet were examined. The results are shown in Table 2.

mixture of the present invention showed a small melt flow index and a high melting tensile strength, and therefore draw down of the obtained sheet was small. Thus the processability was improved. In addition, surface property of the rolled sheet and the extruded sheet was significantly improved in Examples 6 to 9. Also, each molded article obtained in Examples 6 to 9 was excellent in balance between processability, impact resistance and rigidity (flexural elasticity).

EXAMPLE 10

There were mixed 60% of a powder of the graft copolymer (B)-1 and 40% of PP, and the resultant mixture was kneaded and extruded by using a twin screw extruder (screw diameter: 44 mm, L/D: 30) at 200° C., 100 rpm to give a masterbatch.

There were mixed 50 parts of thus obtained masterbatch, 80 parts of PP, 50 parts of heavy calcium carbonate (mean particle diameter: 1.8 μm) of which surface was treated with a fatty acid (hereinafter referred to as "(C)-2") and 0.5 part of calcium stearate (hereinafter referred to as "CaS"), and the resultant mixture was kneaded and extruded by using a twin screw extruder (screw diameter: 44 mm, L/D: 30) at 200° C., 100 rpm to give a pellet.

In the same manner as described in Example 1, from the pellet were prepared a rolled sheet, a test piece and a sheet and physical properties thereof were examined. The results are shown in Table 4.

Melting tensile strength of the Pellet was measured with dies (1 mm×10 mm) at an extrusion speed of 5 mm/minute.

The obtained rolled sheet was dyed with osmium tetroxide and dispersibility of the core-shell graft copolymer, as a property of the rolled sheet was observed by means of a transmission type electron microscope, and estimated according to the following criterion for evaluation.

A: Remarkably excellent dispersibility
B: Excellent dispersibility
C: Poor dispersibility

TABLE 2

| | Composition (part) | | | Physical properties | | | | | | | |
|---|---|---|---|---|---|---|---|---|---|---|---|
| | | Core-shell graft | Inorganic | Melting tensile | Melt flow index | Impact resistance (kg · cm/cm) | | Flexural elasticity | Draw down | Surface condition | |
| | Polyolefin (A) | copolymer (B) | filler (C) | strength (g) | (g/10 minutes) | 23° C. | −20° C. | (kg/cm²) | (mm) | Extruded sheet | Rolled sheet |
| Example No. | | | | | | | | | | | |
| 6 | PP (100) | (B)-1 (20) | 50 | 11 | 0.3 | 12 | 6 | 14000 | 25 | A | A |
| 7 | PP (100) LDPE (50) | (B)-1 (20) | 50 | 13 | 0.4 | 13 | 7 | 11000 | 20 | A | A |
| 8 | PP (100) | (B)-3 (20) | 50 | 11 | 0.4 | 11 | 6 | 14000 | 25 | A | A |
| 9 | PP (100) LDPE (20) | (B)-3 (20) | 50 | 13 | 0.4 | 13 | 7 | 13000 | 20 | A | A |
| Comparative Example No. | | | | | | | | | | | |
| 6 | PP (100) | — | 50 | 10 | 0.6 | 8 | 4 | 16000 | 90 | C | C |
| 7 | PP (100) LDPE (50) | — | 50 | 10 | 0.7 | 8 | 4 | 11000 | 20 | C | C |

The results shown in Table 2 show that each polypropylene mixed with a core-shell graft copolymer and an inorganic filler obtained in Examples 6 to 9 had excellent properties compared with the polyolefin mixed with only an inorganic filler (Comparative Examples 6 to 7). That is, the

EXAMPLE 11

In the same manner as described in Example 10 except that 30 parts of graft copolymer (B)-1, 100 parts of PP, 50 parts of (C)-2 and 0.5 part of CaS were mixed all at once, a pellet was prepared, and a rolled sheet, a test piece and a sheet were prepared therefrom.

In the same manner as described in Example 10, physical properties of each of thus obtained pellet, rolled sheet, test piece and sheet were examined. The results are shown in Table 4.

EXAMPLE 12

In the same manner as described in Example 10 except that (C)-2 was not used, a pellet was prepared, and a rolled sheet, a test piece and a sheet were prepared therefrom.

In the same manner as described in Example 10, physical properties of each of thus obtained pellet, rolled sheet, test piece and sheet were examined. The results are shown in Table 4.

EXAMPLE 13

In the same manner as described in Example 11 except that (C)-2 was not used, a pellet was prepared, and a rolled sheet, a test piece and a sheet were prepared therefrom.

In the same manner as described in Example 10, physical properties of each of thus obtained pellet, rolled sheet, test piece and sheet were examined. The results are shown in Table 4.

Mixing methods and components in Examples 10 to 13 are shown in Table 3.

The results in Table 4 show that the resin composition obtained in Example 10 or 12 which was prepared by previously mixing a part of a polyolefin and a core-shell graft copolymer to give a masterbatch and then mixing the obtained masterbatch with the rest of the polyolefin, an inorganic filler and the other component, had excellent properties compared with the resin composition obtained in Example 11 or 13 which was prepared by mixing all components at once. That is, the composition prepared by mixing with using masterbatch showed an excellent dispersibility of the core-shell graft copolymer in the polyolefin, a small melt flow index and a high melting tensile strength, and therefore draw down of the obtained sheet was small. Thus the processability was further improved and also, the impact resistance was further improved, by the mixing method with using masterbatch.

EXAMPLES 14 TO 16 AND COMPARATIVE EXAMPLE 8

Each composition shown in Table 5 was supplied into an extruder for kneading and extruding, which step was a pretreatment for a calendering, to give a molten resin. Each of the obtained molten resin was successively supplied to an inverted L calender to give a rolled sheet having a thickness of 0.5 mm.

Surface condition of the obtained rolled sheet was observed with the naked eye and estimated according to the following criterion for evaluation. The results are shown in Table 5.

TABLE 3

| | | Composition | | | | | | | | |
|---|---|---|---|---|---|---|---|---|---|---|
| | | Composition of master batch (mixing ratio (%)) | | Composition of masterbatch and the rest components (mixing ratio (part)) | | | | Composition of a final resin composition (part) | | |
| | | Polyolefin | Core-shell graft | Polyolefin | | Inorganic | Other | Polyolefin | Core-shell graft | Inorganic | Other |
| Ex. No. | Mixing method | (A) | copolymer(B) | (A) | Masterbatch | filler(C) | (CaS) | (A) | copolymer(B) | filler(C) | (CaS) |
| 10 | Mixing using master batch | 40 | 60 | 80 | 50 | 50 | 0.5 | 100 | 30 | 50 | 0.5 |
| 11 | Mixing at once | — | — | — | — | — | — | 100 | 30 | 50 | 0.5 |
| 12 | Mixing using master batch | 40 | 60 | 80 | 50 | — | 0.5 | 100 | 30 | — | 0.5 |
| 13 | Mixing at once | — | — | — | — | — | — | 100 | 30 | — | 0.5 |

TABLE 4

| | Physical properties | | | | | |
|---|---|---|---|---|---|---|
| Example | Melting tensile | Melt flow index | Impact resistance (kg · cm/cm) | | Draw down | Dispersibility of core-shell graft |
| No. | strength (g) | (g/10 minutes) | 23° C. | −20° C. | (mm) | copolymer |
| 10 | 3 | 0.2 | 6 | 4 | 2 | A |
| 11 | 2.5 | 0.4 | 4 | 3 | 10 | B |
| 12 | 2.9 | 0.2 | 12 | 7 | 5 | A |
| 13 | 2.3 | 0.4 | 8 | 5 | 15 | B |

(Criterion for Evaluation)

A: Excellent surface glossiness
B: A little poor surface glossiness
C: Poor surface glossiness

TABLE 5

| | Composition (part) | | | | Physical property |
|---|---|---|---|---|---|
| | Polyolefin | Core-shell graft copolymer (B) | Inorganic filler (C) ((C)-2) | Other | Surface condition |
| Example No. | | | | | |
| 14 | PP (100) | (B)-1 (20) | 50 | CaS (0.5) | A |
| 15 | PP (100) | (B)-3 (20) | 50 | CaS (0.5) | A |
| 16 | PP (100) HDPE (10) | (B)-3 (10) | 50 | CaS (0.5) | A |
| Comparative Example | | | | | |
| 8 | PP (100) HDPE (20) | — | 50 | CaS (0.5) | C |

HDPE shown in Table 5 means a high density polyethylene having a melt flow index of 0.25 g/10 minutes at 190° C. (hereinafter the same).

As shown in Table 5, each rolled sheet obtained in Examples 14 to 16 was remarkably excellent in surface property.

EXAMPLES 17 TO 20 AND COMPARATIVE EXAMPLES 9 TO 10

Each composition shown in Table 6 was kneaded and extruded by using a twin screw extruder in the same manner as in Example 1 to give a pellet. The obtained pellet was extruded by using a single screw extruder (screw diameter: 50 mm, L/D: 20) with T die at 230° C. to give an extruded sheet having a width of 300 mm and a thickness of of 0.5 mm.

Surface condition of the obtained extruded sheet was examined in the same manner as in Examples 14 to 16. The results are shown in Table 6.

TABLE 6

| | Composition (part) | | | | Physical property |
|---|---|---|---|---|---|
| | Polyolefin | Core-shell graft copolymer (B) | Inorganic filler (C) ((C)-2) | Other | Surface condition |
| Example No. | | | | | |
| 17 | PP (100) | (B)-1 (20) | 50 | CaS (0.5) | A |
| 18 | PP (100) HDPE (10) | (B)-1 (10) | 50 | CaS (0.5) | A |
| 19 | PP (100) | (B)-3 (20) | 50 | CaS (0.5) | A |
| 20 | PP (100) HDPE (10) | (B)-2 (10) | 50 | CaS (0.5) | A |
| Comparative Example | | | | | |
| 9 | PP (100) HDPE (20) | — | 50 | CaS (0.5) | C |
| 10 | PP (100) HDPE (10) EPR (10) | — | 50 | CaS (0.5) | C |

EPR shown in Table 6 means an ethylene-propylene rubber having a melt flow index of 0.4 g/10 minutes at 190° C. (hereinafter the same).

As shown in Table 6, each extruded sheet obtained in Examples 17 to 20 had an excellent surface property.

EXAMPLES 21 TO 22 AND COMPARATIVE EXAMPLES 11 TO 12

Each rolled sheet obtained in Example 16 and Comparative Example 8 and each extruded sheet obtined in Example 20 and Comparative Example 9 were vacuum molded by heating the surface thereof at a temperature of about 170° C. to about 180° C. by means of a cut-sheet type thermoforming machine (made by Asano Laboratories Co., Ltd.) with a cup-shaped mold (aperture: 80 mm, depth: 72 mm, drawing ratio: 0.9, taper: about 15°) and upper and lower heaters having a temperature of 350° C., to give a cup-shaped molded article.

Condition of draw down of the sheet during heating was observed with the naked eye and estimated according to the following criterion for evaluation. The results are shown in Table 7.

(Criterion for Evaluation)

A: Small draw down

B: A little large draw down

C: Large draw down

Deviation of thickness of the obtained cup-shaped molded article was examined by comparing the thickness of the molded article with the thickness of the original sheet (0.5 mm) and estimated according to the following criterion for evaluation. The results are shown in Table 7.

(Criterion for Evaluation)

A: Small deviation of thickness

B: A little large deviation of thickness

C: Large deviation of thickness

TABLE 7

|  | | Physical properties | |
| --- | --- | --- | --- |
| | Used sheet | Draw down | Deviation of thickness |
| Example No. | | | |
| 21 | Example 14 | A | A |
| 22 | Example 18 | A | A |
| Comparative Example | | | |
| 11 | Comparative Example 8 | C | C |
| 12 | Comparative | C | C |

TABLE 7-continued

|  | | Physical properties | |
| --- | --- | --- | --- |
| | Used sheet | Draw down | Deviation of thickness |
| Example 9 | | | |

As shown in Table 7, even when a rolled sheet or an extruded sheet was vacuume formed with heating as in Examples 21 and 22, draw down of the sheet during heating was small and the deviation of thickness of the obtained molded article was small.

EXAMPLES 23 TO 25 AND COMPARATIVE EXAMPLES 13 TO 14

Each composition shown in Table 8 was kneaded and extruded by using a twin screw extruder in the same manner as in Example 1 to give a pellet. The obtained pellet was injection molded at 230° C. to give a test piece which applies to ASTM test.

The obtained test piece was subjected to each of the test for Izod impact resistance and flexural elasticity. The results are shown in Table 8.

The above-mentioned pellet was injection molded at 230° C. to give a plate (100 mm×150 mm, thickness: 3 mm). Presence of warp of the obtained plate was observed with the naked eye and estimated according to the following criterion for evaluation. The results are shown in Table 8.

(Criterion for Evaluation)

A: Small warp

B: A little small warp

C: Large warp

TABLE 8

| | Composition (part) | | | | Physical property | | | |
| --- | --- | --- | --- | --- | --- | --- | --- | --- |
| | | Core-shell | | | | | | |
| | Polyolefin | graft copolymer | Inorganic filler (C) | | Impact resistance (kg · cm/cm) | | Flexural elasticity | |
| | (A) | (B) | ((C)-2) | Other | 23° C. | −20° C. | (kg/cm²) | Warp of plate |
| Example No. | | | | | | | | |
| 23 | PP (100) | (B)-1 (20) | — | — | 15 | 5 | 15000 | A |
| 24 | PP (100) | (B)-1 (30) | 50 | CaS (0.5) | 14 | 4 | 17000 | A |
| 25 | PP (100) | (B)-3 (30) | 50 | CaS (0.5) | 12 | 4 | 17000 | A |
| Comparative Example No. | | | | | | | | |
| 13 | PP (100) | — | — | — | 4 | 2 | 20000 | C |
| 14 | PP (100) HDPE (20) EPR (10) | — | 50 | CaS (0.5) | 15 | 4 | 17000 | C |

As shown in Table 8, each sheet obtained in Examples 23 to 25 was excellent in balance between impact resistance and rigidity (flexural elasticity). Furthermore, the warp of the obtained plate was small and thus dimensional stability was improved.

EXAMPLES 26 TO 27 AND COMPARATIVE EXAMPLE 15

Each composition shown in Table 9 was kneaded and extruded by using a twin screw extruder in the same manner as in Example 1 to give a pellet. The obtained pellet was blow molded at 230° C. to give a bottle having a wall thickness of 0.5 mm.

Condition of draw down of the parison during blow molding was observed with the naked eye and estimated according to the same criterion for evaluation as in Examples 21 and 22. The results are shown in Table 9.

Deviation of thickness of the obtained bottle was determined by measuring a thickness of each part of the bottle and calculating the difference between the maximum value and the minimum value thereof, and then estimated according to the same criterion for evaluation as in Examples 21 and 22. The results are shown in Table 9.

TABLE 9

| | Composition (part) | | Physical properties | |
|---|---|---|---|---|
| | Polyolefin (A) | Core-shell graft copolymer (B) | Draw down | Deviation of thickness |
| Example No. | | | | |
| 26 | 100 | (B)-1 (20) | A | A |
| 27 | 100 | (B)-3 (20) | A | A |
| Comparative Example | | | | |
| 15 | 100 | — | C | C |

As shown in Table 9, in Examples 26 and 27 draw down of parison during blow molding was small and the deviation of thickness of the obtained bottle was small.

EXAMPLES 28 TO 29 AND COMPARATIVE EXAMPLE 16

After components shown in Table 10 were mixed to give a resin composition, the composition was supplied to an extruder for preparing a foam, which had an aperture of 65 mm and equipped with a circular die having an aperture of 10 mm at the top thereof.

Each of trichloromonofluoromethane and dichlorotetrafluoroethane compressed at 100 to 200 $kg/cm^2$ as a blowing agent was pressure-supplied into the extruder through an inlet provided in the middle portion of the extruder, in an amount of about 13 parts, respectivly per 100 parts of the above-mentioned resin composition. With kneading the resin composition and the blowing agent sufficiently, the temperature was cooled down to a temperature suitable for expansion and then the resulting mixture was extruded through the circular die into the air to give a cylinder-shaped foam.

Expansion ratio of the obtained foam was determined as a ratio of volume change per a predetermined weight. The results are shown in Table 10.

Surface conditions of the obtained foam was observed with the naked eye and estimated according to the following criterion for evaluation. The results are shown in Table 10.

(Criterion for Evaluation)

A: Smooth surface and uniform cell structure

B: A little rough surface and non-uniform cell structure owing to slight formation of continuous cells C: Remarkable rough surface and non-uniform cell structure owing to formation of continuous cells

TABLE 10

| | Composition (part) | | | Physical properties | |
|---|---|---|---|---|---|
| | Polyolefin (A) (PPEB) | Core-shell graft copolymer (B) | Other (Cell nucleus forming agent) | Expansion ratio | Surface condition |
| Example No. | | | | | |
| 28 | 100 | (B)-1 (20) | Sodium bicarbonate (0.1) Citric acid (0.1) | 35 | A |
| 29 | 100 | (B)-3 (20) | Sodium bicarbonate (0.1) Citric acid (0.1) | 35 | A |
| Comparative Example | | | | | |
| 16 | 100 | — | Sodium bicarbonate (0.1) Citric acid (0.1) | 35 | C |

PPEB shown in Table 10 means a polypropylene having a melt flow index of 0.5 g/10 minutes at 230° C. (trade name: Noblen EB, available from Mitsui Toatsu Chemicals, INC.).

As shown in Table 10, each foam obtained in Examples 28 and 29 had a high expansion ratio, even surface and uniform cell structure without continuous cells.

What we claim is:

1. A polyolefin resin composition having improved impact strength which consists essentially of:
   (A) a polyolefin,
   (B) 0.1 to 100 parts of a core-shell graft copolymer prepared by graft copolymerizing (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber polymer having a glass transition temperature of not more than 25° C., and
   (C) 0 to 400 parts of an inorganic filler, said parts of (B) and (C) being parts by weights per 100 parts by weight of (A),
   wherein a rolled sheet of a mixture only of said polyolefin (A) and said core-shell graft copolymer (B) has a greater impact strength than a rolled sheet only of said polyolefin resin (A).

2. The composition of claim 1, wherein said polyolefin (A) is a propylene polymer comprising at least 50% by weight of propylene.

3. The composition of claim 1, wherein said polyolefin (A) comprises a propylene polymer containing at least 50% by weight of propylene and 0 to 100 parts by weight of polyethylene per 100 parts by weight of said propylene polymer.

4. The composition of claim 1, wherein said polyolefin (A) has a melt flow index of not more than 4 g/10 minutes at 230° C.

5. The composition of claim 1, wherein said crosslinked rubber-like polymer (a) is a diene rubber comprising 60 to 100% by weight of a diene compound and 0 to 40% by weight of other vinyl compound copolymerizable with said diene compound.

6. The composition of claim 1, wherein said crosslinked rubber-like polymer (a) is an acrylic rubber comprising 60 to 100% by weight of an alkyl acrylate having a $C_2$ to $C_{22}$ alkyl group and 0 to 40% by weight of other vinyl compound copolymerizable with said alkyl acrylate.

7. The composition of claim 1, wherein said monomer component (b) comprises 50 to 100% by weight of at least one of an aromatic vinyl compound and an alkyl methacrylate and 0 to 50% by weight of other vinyl compound copolymerizable therewith.

8. The composition of claim 7, wherein said aromatic vinyl compound is at least one of styrene and α-methylstyrene.

9. The composition of claim 7, wherein said alkyl methacrylate has a $C_1$ to $C_8$ alkyl group.

10. The composition of claim 1, wherein said core-shell graft copolymer (B) is prepared by emulsion polymerization.

11. The composition of claim 1, wherein said core-shell graft copolymer (B) has a mean particle diameter of not more than 3 μm.

12. The composition of claim 1, wherein said inorganic filler (C) is at least one of calcium carbonate and talc.

13. A process for preparing a polyolefin resin composition which comprises mixing a part of a non-grafted polyolefin (A) with 0.1 to 100 parts by weight of a core-shell graft copolymer (B) per 100 parts by weight of said non-grafted polyolefin (A) to give a masterbatch, and mixing said masterbatch with the rest of said non-grafted polyolefin (A) and 0 to 400 parts by weight of an inorganic filler (C) per 100 parts by weight of said non-grafted polyolefin (A), said core-shell graft copolymer (B) being a graft copolymerization product of (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber polymer having a glass transition temperature of not more than 25° C.,
   wherein a rolled sheet of the resulting mixture only of said non-grafted polyolefin (A) and said core-shell graft copolymer (B) has a greater impact strength than a rolled sheet only of said non-grafted polyolefin resin (A).

14. A molded article of the said composition of claim 1.

15. The molded article of claim 14 which is a film or sheet perpared by calendering.

16. The molded article of claim 14 which is a film or sheet prepared by extrusion.

17. The molded article of claim 14 which is prepared by thermoforming a film or sheet.

18. The molded article of claim 14 which is prepared by injection molding.

19. The molded article of claim 14 which is a hollow article prepared by blow molding.

20. The molded article of claim 14 which is a foam prepared by expansion molding of said composition containing a blowing agent.

21. The composition of claim 1, wherein said polyolefin (A) is at least one member selected from the group consisting of polypropylene; high density polyethylene; low density polyethylene; linear low density polyethylene; poly-1-butene; polyisobutylene; a random or block copolymer of propylene and at least one of ethylene and 1-butene in any ratio; a terpolymer of ethylene, propylene and at least 10% by weight of a diene wherein ethylene and propylene can be present in any ratio; polymethylpentene; and a random or block copolymer of ethylene or propylene with not more than 50% by weight of a vinyl compound.

22. The composition of claim 1, wherein said core-shell graft copolymer (B) has a core and a single shell layer.

23. The composition of claim 1, which excludes a compatibilizer.

24. The composition of claim 23, wherein said compatibilizer is a graft polymer of a polyolefin and a methacrylate.

25. A composition having improved impact strength consisting essentially of a mixture of a non-grafted polyolefin resin (A) and only one graft copolymer (B), said graft copolymer (B) is a core-shell graft copolymer prepared by graft copolymerizing (b) 5 to 60 parts by weight of a monomer component comprising a copolymerizable vinyl compound selected so that the glass transition temperature of a polymer of said monomer component alone is not less than 25° C., onto (a) 40 to 95 parts by weight of a crosslinked rubber polymer having a glass transition temperature of not more than 25° C., said graft copolymer (B)

is present in an amount of 0.1 to 100 parts by weight per 100 parts by weight of said polyolefin (A), wherein said core-shell copolymer (B) is compatible by itself with said non-grafted polyolefin (A) as measured by a rolled sheet only of said mixture of said non-grafted polyolefin (A) and said core-shell graft copolymer (B) having a greater impact strength than a rolled sheet only of said polyolefin resin (A).

26. The composition of claim 25, which contains 0 to 400 parts by weight of an inorganic filler per 100 parts by weight of said polyolefin (A).

* * * * *